US010066773B2

(12) United States Patent
Takimoto et al.

(10) Patent No.: US 10,066,773 B2
(45) Date of Patent: Sep. 4, 2018

(54) PIPING CONNECTION STRUCTURE

(71) Applicant: Sumitomo Riko Company Limited, Komaki-shi, Aichi (JP)

(72) Inventors: Yorihiro Takimoto, Kasugai (JP); Koji Mizutani, Ichinomiya (JP); Kazutaka Katayama, Kasugai (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 1065 days.

(21) Appl. No.: 14/324,970

(22) Filed: Jul. 7, 2014

(65) Prior Publication Data

US 2014/0319820 A1    Oct. 30, 2014

Related U.S. Application Data

(63) Continuation of application No. PCT/JP2013/081307, filed on Nov. 20, 2013.

(30) Foreign Application Priority Data

Dec. 20, 2012 (JP) .................................. 2012-278342

(51) Int. Cl.
*F16L 37/14* (2006.01)
*F16L 37/088* (2006.01)
(Continued)

(52) U.S. Cl.
CPC ........... *F16L 37/144* (2013.01); *F16L 37/088* (2013.01); *F16L 37/098* (2013.01); *F16L 47/02* (2013.01);
(Continued)

(58) Field of Classification Search
CPC ..................................................... F16L 37/144
(Continued)

(56) References Cited

U.S. PATENT DOCUMENTS 4,260,184 A * 4/1981 Greenawalt ............. F16L 37/53
285/305
4,696,326 A * 9/1987 Sturgis ................. B67D 7/0294
137/614.04
(Continued)

FOREIGN PATENT DOCUMENTS

EP    1892450 A2    2/2008
EP    2 251 581 A1    11/2010
(Continued)

OTHER PUBLICATIONS

Jun. 1, 2016 Office Action issued in Chinese Patent Application No. 201380031254.3.
(Continued)

*Primary Examiner* — James M Hewitt, II
(74) *Attorney, Agent, or Firm* — Oliff PLC

(57) ABSTRACT

A piping connection structure which assigns a function to restrict a pipe body from coming off to a member other than a resin tube, improves in sealing performance and can suppress the amount of fuel permeation. A resin tube comprises a tube body portion; a first diameter-expanding portion formed to increase in diameter from an axial end of the tube body portion and axially positioning seal members by holding the seal members in an axial gap with a retainer; and a second diameter-expanding portion formed to further increase in diameter from the first diameter-expanding portion, and to contact an outer circumferential side of the seal members and be connected to the retainer while in contact with the retainer. Thickness of the first diameter-expanding portion is equal to or greater than thickness of the tube body portion.

12 Claims, 9 Drawing Sheets

(51) Int. Cl.
*F16L 37/098* (2006.01)
*F16L 47/02* (2006.01)
*F16L 11/04* (2006.01)
*F02M 37/00* (2006.01)

(52) U.S. Cl.
CPC .... *F02M 37/0017* (2013.01); *F16L 2011/047* (2013.01); *F16L 2201/10* (2013.01)

(58) Field of Classification Search
USPC .......................................................... 285/319
See application file for complete search history.

(56) References Cited

U.S. PATENT DOCUMENTS

| | | | |
|---|---|---|---|
| 5,181,751 A | | 1/1993 | Kitamura |
| 5,568,946 A | * | 10/1996 | Jackowski .......... F16L 37/0987 285/308 |
| 5,609,370 A | * | 3/1997 | Szabo ................. F16L 37/0985 285/319 |
| 2002/0158465 A1 | * | 10/2002 | Tsurumi ............. F16L 37/0987 285/93 |
| 2005/0200125 A1 | * | 9/2005 | Andre .................. F16L 37/144 285/305 |
| 2006/0066100 A1 | * | 3/2006 | Nakashima ............. F16L 33/22 285/305 |
| 2008/0048442 A1 | | 2/2008 | Kerin et al. |
| 2010/0052315 A1 | | 3/2010 | Kerin et al. |
| 2010/0276924 A1 | | 11/2010 | Gillet et al. |
| 2012/0161435 A1 | | 6/2012 | Yamada et al. |
| 2013/0082459 A1 | * | 4/2013 | Kaneko ................. F16L 37/088 285/93 |

FOREIGN PATENT DOCUMENTS

| | | |
|---|---|---|
| FR | 2891889 A1 | 4/2007 |
| JP | A-04-39492 | 2/1992 |
| JP | A-07-260072 | 10/1995 |
| JP | A-08-121666 | 5/1996 |
| JP | A-2001-500230 | 1/2001 |
| JP | A-2006-200738 | 8/2006 |
| JP | A-2008-261450 | 10/2008 |
| JP | A-2010-071465 | 4/2010 |
| JP | A-2012-117621 | 6/2012 |
| WO | WO-2010061072 A1 * | 6/2010 .............. F16L 21/03 |

OTHER PUBLICATIONS

Jun. 30, 2016 Extended Search Report issued in European Patent Application No. 13 864 036.2.
Jul. 7, 2016 Office Action issued in Japanese Patent Application No. 2012-278342.
Feb. 18, 2014 International Search Report issued in International Application No. PCT/JP2013/081307 (with translation).
Apr. 18, 2018 Office Action issued in European Patent Application No. 13 864 036.2.

* cited by examiner

PIPING CONNECTION STRUCTURE

CROSS-REFERENCE TO RELATED APPLICATION

This is a continuation of Application PCT/JP2013/081307, filed on Nov. 20, 2013, which is incorporated herein by reference.

The present invention is based on Japanese Patent Application No. 2012-278342, filed on Nov. 20, 2012, the entire contents of which are incorporated herein by reference.

BACKGROUND OF THE INVENTION

Field of the Invention

The present invention relates to a piping connection structure for connecting a resin tube and a pipe body.

Description of the Related Art

In recent years, it has been proposed to constitute part or all of the function of a connector with a resin tube in a piping connection portion in order to reduce size and costs of that portion. For example, PTLs 1 to 5 describe structures in which a seal member is disposed between a diameter-expanded portion of a resin tube and a pipe body by processing an end portion of the resin tube beforehand so as to expand its diameter. These documents also mention that the pipe body is restricted from coming off by processing the end portion of the resin tube beforehand and having this portion of the resin tube caught by an annular projection of the pipe body.

CITATION LIST

PTL 1: JP-A-2006-200738
PTL 2: JP-A-2001-500230
PTL 3: JP-A-2012-117621
PTL 4: JP-A-7-260072
PTL 5: JP-A-8-121666

SUMMARY OF THE INVENTION

However, in the structures in which the pipe body is restricted by having the previously processed portion of the resin tube caught by the annular projection of the pipe body, that portion of the resin tube is deformed also in removing the pipe body. If the number of times of removing and inserting the pipe body increases in these structures, engaging force of the resin tube decreases. Therefore, it is desired that a function to restrict the pipe body from coming off is assigned to a member other than the resin tube.

Furthermore, the diameter-expanded portion of the resin tube is formed thinner than a tube body portion. Here the diameter-expanded portion serves as a portion for axially positioning the seal member. Sometimes external force is applied and thereby the resin tube receives axial force from the seal member. If the diameter-expanded portion does not have a sufficiently high elastic modulus in such a case, the resin tube will be deformed and cause a decrease in sealing performance.

Moreover, since fluid such as fuel flows through an inside of the diameter-expand portion of the resin tube in the above structures, the amount of fuel permeation in that portion of the resin tube needs to be considered. The amount of fuel permeation depends on thickness of the resin tube. Therefore, a decrease in thickness of the diameter-expanded portion of the resin tube has a risk of increasing the amount of fuel permeation.

The present invention has been made in view of these circumstances. It is an object of the present invention to provide a piping connection structure which assigns a function to restrict a pipe body from coming off to a member other than a resin tube, improves in sealing performance and can suppress the amount of fuel permeation.

A piping connection structure according to the present solution comprises a pipe body having an annular projection projecting radially outward at some distance from a fore end thereof; a resin tube into which a fore end side of the pipe body is to be inserted; a retainer formed in a hollow cylindrical shape, connected to an axial end of the resin tube, and restricting the pipe body from coming off by being engaged with the annular projection of the pipe body when the pipe body is inserted therein; and a seal member to be disposed in a radial gap between an inner circumferential surface of the resin tube and an outer circumferential surface of the pipe body.

The resin tube comprises a tube body portion; a first diameter-expanding portion formed to increase in diameter from an axial end of the tube body portion, and axially positioning the seal member by holding the seal member in an axial gap with the retainer; and a second diameter-expanding portion formed to further increase in diameter from the first diameter-expanding portion, and to contact an outer circumferential side of the seal member and be connected to the retainer while in contact with the retainer. Additionally, the first diameter-expanding portion has the same or greater thickness than the tube body portion.

According to the piping connection structure of the present solution, the retainer in the form of a separate body from the resin tube is used as a member for restricting the pipe body from coming off. That is to say, the resin tube is not to be caught by the annular projection of the pipe body and, even if the pipe body is removed from or inserted into the resin tube, it gives no effect on the resin tube. Hence, according to the present solution, the resin tube can improve in durability.

Moreover, in the resin tube according to the present solution, the first diameter-expanding portion has the same or greater thickness than the tube body portion. Even if external force is applied and thereby the first diameter-expanding portion of the resin tube receives axial force from the seal member, this suppresses deformation of the first diameter-expanding portion and, as a result, suppresses a decrease in sealing performance. Furthermore, since the first diameter-expanding portion has the same or greater thickness than the tube body portion, the amount of fuel permeation in the first diameter-expanding portion can be equal to or smaller than the amount of fuel permeation in the tube body portion.

Preferred aspects of the piping connection structure according to the above solution will be described below.

The first diameter-expanding portion may have a tapered portion, and thickness of the tapered portion of the first diameter-expanding portion may increase in a radially outward direction. Since this allows a continuous increase in elastic modulus of the first diameter-expanding portion, deformation of the first diameter-expanding portion can be further suppressed and as a result sealing performance can be further improved. Moreover, the amount of fuel permeation can be suppressed. Additionally, upon having a tapered shape, that portion can allow smooth passage of fuel.

Furthermore, the second diameter-expanding portion can be connected to the retainer by welding. This ensures connection of the resin tube and the retainer. Additionally, welding allows shape simplification of the second diameter-expanding portion and the retainer.

In this case, the retainer can have an inner cylindrical portion and an outer cylindrical portion having a radial gap therebetween, and the second diameter-expanding portion can be inserted in the radial gap between the inner cylindrical portion and the outer cylindrical portion of the retainer. This secures a sufficiently large weld area and ensures exhibition of great connecting force. Moreover, since the second diameter-expanding portion is inserted between the inner cylindrical portion and the outer cylindrical portion, the second diameter-expanding portion is suppressed from being deformed to fall down. This also ensures exhibition of great connecting force.

Connection of the second diameter-expanding portion and the retainer can be achieved by the following methods in addition to welding. That is to say, the retainer and the second diameter-expanding portion can have an engagement pair whose elements axially catch each other, and the retainer and the second diameter-expanding portion can be connected together by the engagement pair. The engagement pair means a recess formed on one and a projection formed on the other. That is to say, a recess is formed on one of the retainer and the second diameter-expanding portion and a projection is formed on the other. Upon physically catching each other, the thus located elements of the pair achieve reliable connection of these two portions.

In this case, it is preferable that the second diameter-expanding portion has the same or greater thickness than the tube body portion. Since a recess or a projection is formed on the second diameter-expanding portion, the second diameter-expanding portion needs to have a sufficiently great thickness. Therefore, designing the second diameter-expanding portion to have the same or greater thickness than the tube body portion ensures formation of one element of the pair. That is to say, the engagement pair can exhibit a sufficient engagement force.

Furthermore, the retainer can have an inner cylindrical portion and an outer cylindrical portion having a radial gap therebetween; the second diameter-expanding portion can be inserted in the radial gap between the inner cylindrical portion and the outer cylindrical portion; and at least one of the inner cylindrical portion and the outer cylindrical portion, and the second diameter-expanding portion can have the engagement pair. Here, since the retainer and the second diameter-expanding portion are connected together by catching each other, if one of the two should radially deform, engaging force may decrease. However, since the second diameter-expanding portion is inserted between the inner cylindrical portion and the outer cylindrical portion of the retainer, the second diameter-expanding portion cannot deform either in a radially outward direction or in a radially inward direction of the retainer. Therefore, engaging force of the two can be very strong.

The engagement pair can be provided discontinuously in a circumferential direction, and the retainer and the second diameter-expanding portion can have at least one guide pair for guiding relative rotational phases in fitting each other. If the engagement pair is continuously provided in the circumferential direction, it is not easy to fit the second diameter-expanding portion to the retainer. Therefore, the engagement pair is provided discontinuously in the circumferential direction. In this case, however, in fitting the second diameter-expanding portion to the retainer, rotational phases of the engagement pair of these two members need to be in agreement with each other. Therefore, at least one guide pair is provided in order to bring the rotational phases of the engagement pair of the two members in agreement with each other. This makes it easy to fit the second diameter-expanding portion to the retainer.

Furthermore, the at least one guide pair may comprise a plurality of guide pairs distributed uniformly in a circumferential direction. This ensures well-balanced exhibition of connecting force of the two members.

DESCRIPTION OF THE PREFERRED EMBODIMENTS

Example 1

Piping Connection Structure Overview

Figure 1A:
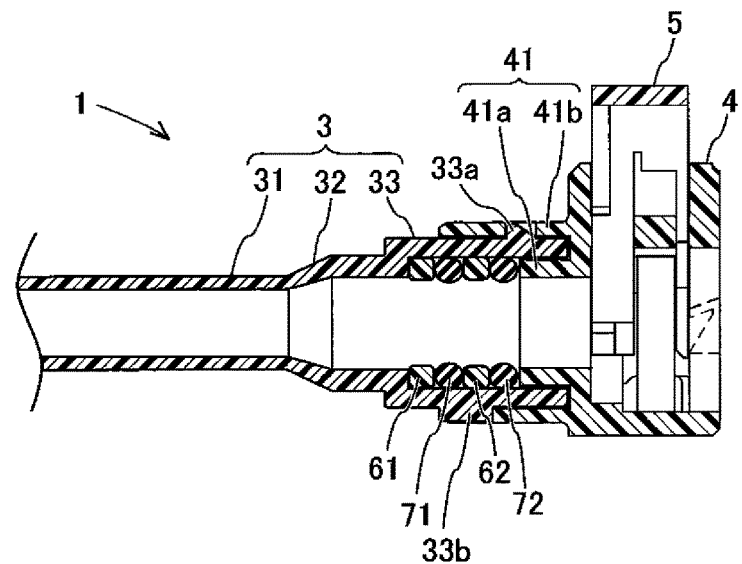
FIG. 1A is an axial cross-sectional view illustrating a piping connection structure of Example 1 in a state before a pipe body is inserted (an initial state).

An overview of a piping connection structure of the present example will be described with reference to FIGS. 1A to 1D. As shown in FIG. 1C, the piping connection structure constitutes, for example, a gasoline fuel piping 1 of an automobile and corresponds to a portion for connecting a pipe body 2 and a resin tube 3. As shown in FIG. 1C, the piping 1 comprises the pipe body 2, the resin tube 3, a retainer 4, a checker 5, collars 61, 62 and seal members 71, 72.

As shown in an initial state view of FIG. 1A, the resin tube 3 and the retainer 4 are connected together, and the collar 61, the seal member 71, the collar 62, and the seal member 72 are arranged in this order in an inner circumferential surface side of the resin tube 3. Moreover, the checker 5 has been assembled to the retainer 4. From this state, the pipe body 2 is inserted in the retainer 4 as shown in a pipe body-inserted state view of FIG. 1B. At this time, a fore end side of the pipe body 2 contacts the seal members 71, 72, and the seal members 71, 72 are held in a radial gap between an outer circumferential surface of the pipe body 2 and an inner circumferential surface of the resin tube 3, thereby exhibiting a sealing function.

Subsequently, as shown in a confirmed state view of FIG. 1C, it is confirmed by pushing in the checker 5 that the pipe body 2 has been inserted in a normal position in the retainer 4. Then, as shown in a release state view of FIG. 1D, the retainer is placed in a release state by further pushing in the checker 5, thereby allowing the pipe body 2 to be removed from the retainer 4.

Hereinafter, detailed configurations of respective parts will be described. It should be noted that the retainer 4 and the checker 5 have almost the same configurations as those of a second housing (30) and a checker (50) described in Japanese Patent No. 4,937,426.

Detailed Configuration of Respective Parts

Detailed Configuration of Pipe Body

Figure 1B:
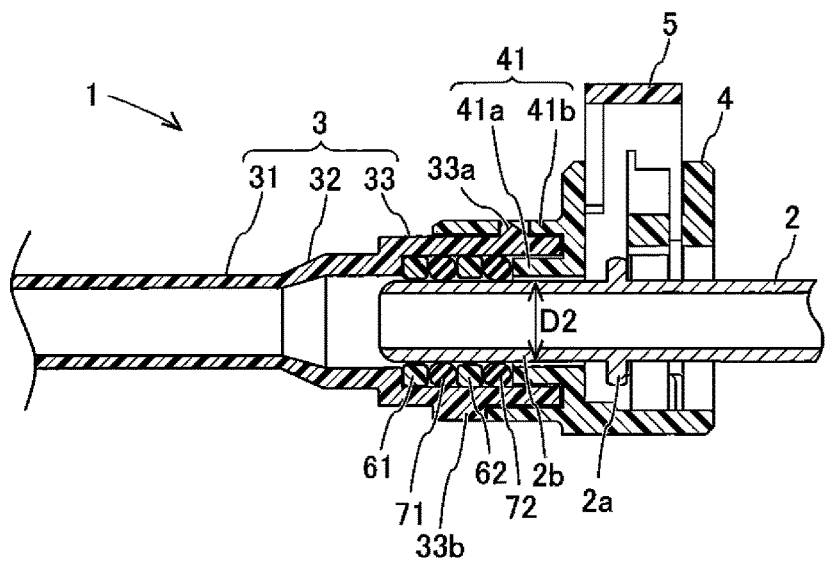
FIG. 1B is an axial cross-sectional view illustrating a state in which the pipe body has been inserted into the pipe connection structure in the initial state of FIG. 1A (a pipe body-inserted state).
Figure 1C:
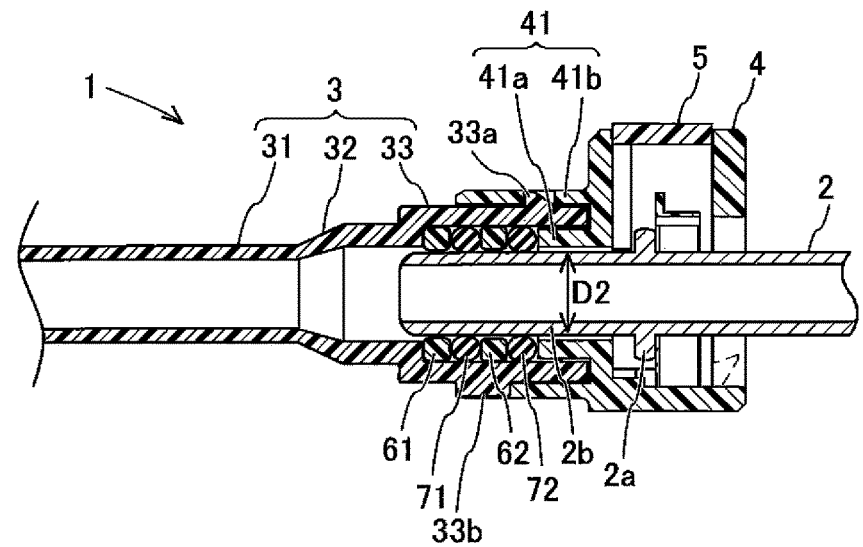
FIG. 1C is an axial cross-sectional view illustrating a state in which it has been confirmed by sliding a checker from the pipe body-inserted state of FIG. 1B (a confirmed state) that the pipe body has been inserted in a normal position.
Figure 1D:
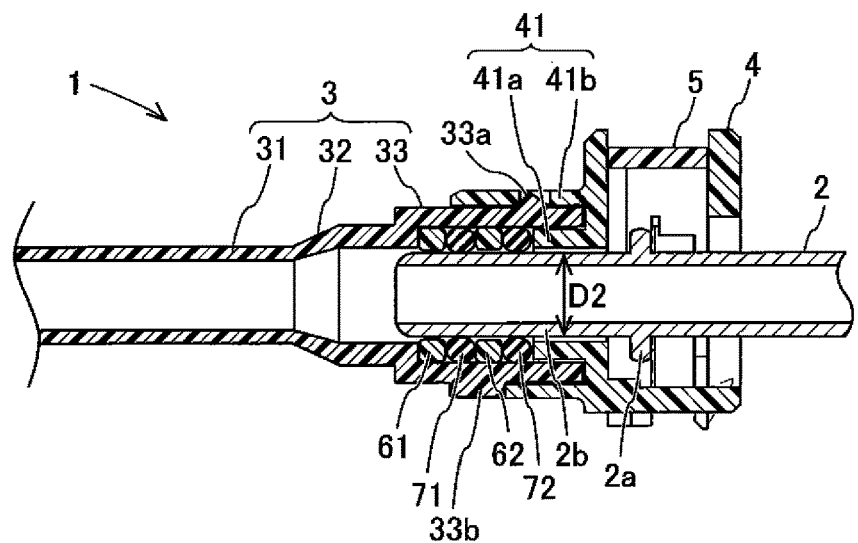
FIG. 1D is an axial cross-sectional view illustrating a release state in which the checker has been further slid from the confirmed state of FIG. 1C to allow the pipe body to be removed.

As shown in FIG. 1B, the pipe body 2 is formed of metal in a hollow cylindrical shape, and has an annular projection 3a projecting radially outward at some distance from a fore end thereof. A foremost end of the pipe body 2 is chamfered. A portion 2b of the pipe body 2 on a fore end side of the annular projection 2a has an outer circumferential surface shape having an axially uniform outer diameter D2 which is smaller than an outer diameter of the annular projection 2a. As shown in FIG. 1B, the fore end side portion 2b of the pipe body 2 is a portion to be inserted in the resin tube 3 and contact the seal members 71, 72.

Detailed Configuration of Resin Tube

A detailed configuration of the resin tube 3 will be described with reference to FIGS. 2A to 2C. The resin tube 3 is integrally formed by extrusion molding. Here, a radial thickness, an inner diameter and an outer diameter of the resin tube 3 can be freely determined by extrusion molding. The resin tube 3 in this example makes positive changes in the radial thickness, the inner diameter and the outer diameter. Examples of the material of the resin tube 3 include polyimide-based resin (aliphatic polyamides such as PA6, PA66, PA410, PA610, PA612, PA46, PA610, PA6/12, PA1012, PA1010, PA11 and PA12, aromatic polyamides such as PA4T, PA6T, PA9T, PA10T, PA11T, PA12T, and MXD nylon), polyester-based resin such as PBT, PET, and PBN, and polyolefin resin such as PE and PP.

Figure 2A:
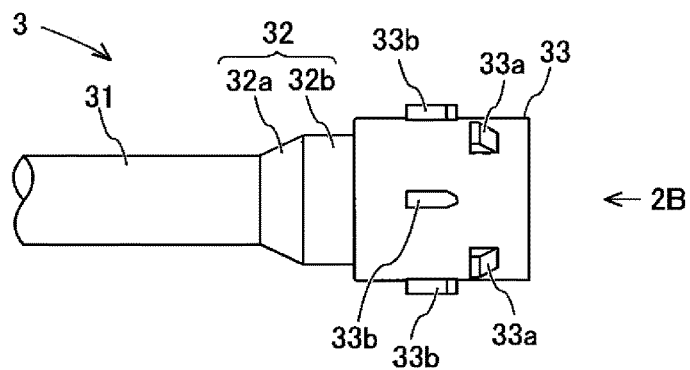
FIG. 2A is a front view of a resin tube of FIG. 1A.
Figure 2B:
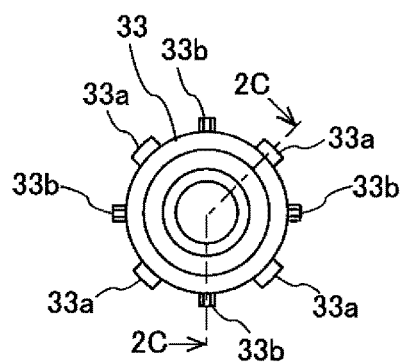
FIG. 2B is a right side view of the resin tube of FIG. 2B.
Figure 2C:
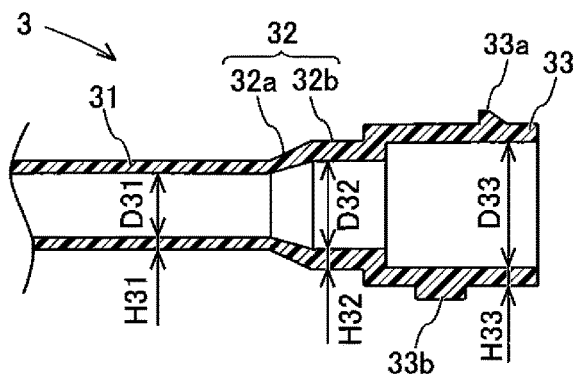
FIG. 2C is a cross-sectional view taken along line 2C-2C of FIG. 2B.

As shown in FIGS. 2A to 2C, this resin tube 3 comprises a tube body portion 31, a first diameter-expanding portion 32, and a second diameter-expanding portion 33.

The tube body portion 31 constitutes a main part of a fuel conveyor portion of the resin tube 3 and is a longest portion. As shown in FIG. 2C, the tube body 31 has an inner diameter D31, which is approximately equal to an outer diameter D2 of the fore end side portion 2b (shown in FIGS. 1B to 1D) of the pipe body 2. The inner diameter D31 of the tube body portion 31 is determined in consideration of fuel flow rate, fuel flow volume, etc.

Moreover, the tube body portion 31 has a radial thickness H31. This thickness H31 is determined mainly in consideration of the amount of fuel permeation. Since the tube body portion 31 conveys fuel, fuel permeates the tube body portion 31. The amount of fuel permeation decreases with an increase in radial thickness of the tube body portion 31. That is to say, the radial thickness of the tube body portion 31 is defined in consideration of the amount of fuel permeation and the material of the resin tube 3.

As shown in FIG. 2C, the first diameter-expanding portion 32 is formed so as to increase in diameter from an axial end of the tube body portion 31 toward an open end of the resin tube 3. Furthermore, the first diameter-expanding portion 32 axially positions the collars 61, 62 and the seal members 71, 72 by holding the collars 61, 62 and the seal members 71, 72 in an axial gap with a tube engagement portion 41 of the retainer 4.

Specifically, the first diameter-expanding portion 32 comprises a tapered diameter-expanding portion 32a on a side of the tube body portion 31, and a cylindrical portion 32b on an open end side of the resin tube 3, which is an opposite side to the tube body portion 31. The tapered diameter-expanding portion 32a has an inner diameter D31 on a small diameter side and an inner diameter D32 on a large diameter side. The tapered diameter-expanding portion 32a is formed to increase in thickness in a radially outward direction. In other words, the tapered diameter-expanding portion 32a is formed to increase in thickness toward the open end side of the resin tube 3. Specifically, the tapered diameter-expanding portion 32 has a thickness H31 on the small diameter side and a thickness H32 on the large diameter side.

Here, as mentioned above, the amount of fuel permeation depends on thickness of the resin tube 3. Accordingly, the tapered diameter-expanding portion 32a has a smaller amount of fuel permeation than the tube body portion 31. Furthermore, elastic modulus of the resin tube 3 increases with an increase in thickness of the resin tube 3. Accordingly, the tapered diameter-expanding portion 32a of the first diameter-expanding portion 32 has a greater elastic modulus than the tube body portion 31. That is to say, the tapered diameter-expanding portion 32a is less deformable than the tube body portion 31.

The cylindrical portion 32b of the first diameter-expanding portion 32 is formed to have the same thickness as the thickness H32 of a thick end portion of the tapered diameter-expanding portion 32a. That is to say, the cylindrical portion 32b is formed thicker than the tube body portion 31. Accordingly, the cylindrical portion 32b has a greater elastic modulus and a smaller amount of fuel permeation than the tube body portion 31. Moreover, an end portion of the cylindrical portion 32b of the first diameter-expanding portion 32 positions the collars 61, 62 and the seal members 71, 72 in an axial gap with the tube engagement portion 41 of the retainer 4.

The second diameter-expanding portion 33 is formed to further increase in diameter from the end portion of the first diameter-expanding portion 32 toward the open end side of the resin tube 3. An inner circumferential surface of the second diameter-expanding portion 33 holds the seal members 71, 72 in a radial gap with the fore end side portion 2b of the pipe body 2 by contacting an outer circumferential side of the seal members 71, 72. Furthermore, the second diameter-expanding portion 33 is to be connected to the tube engagement portion 41 while in contact with the tube engagement portion 41 of the retainer 4.

Specifically, an inner diameter D33 of the second diameter-expanding portion 33 is greater than the inner diameter D32 of the cylindrical portion 32b of the first diameter-expanding portion 32 and smaller than an outer diameter of the seal members 71, 72 in its natural state. Moreover, a thickness H33 of the second diameter-expanding portion 33 is approximately equal to the thickness H32 of the cylindrical portion 32b of the first diameter-expanding portion 32.

The second diameter-expanding portion 33 and the tube engagement portions 41 of the retainer 4 have projection and recess-shaped engagement pairs whose elements catch each other in an axial direction. That is to say, in the present example, the resin tube 3 and the retainer 4 are connected together by the engagement pairs. Here, in the present example, projections 33a as one-side elements of the engagement pairs are provided on the second diameter-expanding portion 33 and recesses 41c as the-other-side elements of the engagement pairs are provided on the tube engagement portion 41 of the retainer 4. That is to say, a plurality of (four in the present example) engagement projections 33a are formed on an outer circumferential side of the second diameter-expanding portion 33 discontinuously in a circumferential direction and at regular circumferential intervals.

Furthermore, the second diameter-expanding portion 33 and the tube engagement portion 41 of the retainer 4 have projection and recess-shaped guide pairs which guide relative rotational phases in fitting each other. That is to say, in the present example, rotational phases are adjusted to desired ones by the guide pairs in fitting the retainer 4 to the resin tube 3. Here, in the present example, projections 33b as one-side elements of the guide pairs are provided on the second diameter-expanding portions 33, while recesses 41d as the-other-side elements of the guide pairs are provided on the tube engagement portion 41 of the retainer 4. That is to say, a plurality of (four in the present example) of guide projections 33b are formed on an outer circumference of the second diameter-expanding portion 33 on an opposite side of the engagement projections 33a to the open end discontinuously in a circumferential direction and at regular circumferential intervals. It should be noted that phases of the guide projections 33b deviate from those of the engagement projections 33a. Here, the engagement projections 33a are formed longer in the circumferential direction than in an axial direction. On the other hand, the guide projections 33b are formed longer in the axial direction than in the circumferential direction.

Detailed Configuration of Retainer

Next, a detailed configuration of the retainer 4 will be described with reference to FIGS. 3A to 3F. The retainer 4 is formed in a hollow cylindrical shape and connected to an axial end of the resin tube 3. With the pipe body 2 inserted, the retainer 4 restricts the pipe body 2 from coming off by being engaged with the annular projection 2a of the pipe body 2. Examples of the material of the retainer 4 include polyimide-based resin (aliphatic polyamides such as PA6, PA66, PA410, PA610, PA612, PA46, PA610, PA6/12, PA1012, PA1010, PA11 and PA12, and aromatic polyamides such as PA4T, PA6T, PA9T, PA10T, PA11T, PA12T, and MXD nylon), polyester-based resin such as PBT, PET, and PBN, and polyolefin resin such as PE and PP.

This retainer 4 comprises the tube engagement portion 41, a retainer body 42 and a retainer diameter-expanding elastically-deformable claw 49. The tube engagement portion 41 is formed in a hollow cylindrical shape and comprises an inner cylindrical portion 41a and an outer cylindrical portion 41b having a radial gap therebetween. As shown in FIG. 1B, the second diameter-expanding portion 33 of the resin tube 3 is inserted into the radial gap between the inner cylindrical portion 41a and the outer cylindrical portion 41b.

The inner cylindrical portion 41a holds the collars 61, 62 and the seal members 71, 72 in an axial gap with the cylindrical portion 32b of the first diameter-expanding portion 32 of the resin tube 3. That is to say, the inner cylindrical portion 41a of the tube engagement portion 41 of the retainer 4 axially positions the collars 61, 62, and the seal members 71, 72.

The plurality of (four in the present example) engagement recesses 41c are formed on the outer cylindrical portion 41b discontinuously in a circumferential direction and distributed uniformly in the circumferential direction. The engagement recesses 41c radially penetrate a wall of the outer cylindrical portion 41b. The engagement recesses 41c constitute the engagement pairs together with the engagement projections 33a of the second diameter-expanding portion 33 of the resin tube 3. That is to say, the resin tube 3 and the retainer 4 are connected together by having the engagement projections 33a and the engagement recesses 41c catch each other.

Furthermore, a plurality of (four in the present example) guide recesses 41d are formed on an open end periphery of the outer cylindrical portion 41b discontinuously in a circumferential direction and distributed uniformly in the circumferential direction. The guide recesses 41d radially penetrate a wall of the outer cylindrical portion 41b. These guide recesses 41d constitute the guide pairs together with the guide projections 33b of the second diameter-expanding portion 33 of the resin tube 3. That is to say, the guide recesses 41d and the guide projections 33b play a guide function by having the guide projections 33b inserted in the guide recesses 41d. Then, the engagement projections 33a and the engagement recesses 41c can catch each other.

The retainer body 42 is integrally formed with the tube engagement portion 41 and is an undeformable portion, which distinguishes the retainer body 42 from the retainer diameter-expanding elastically-deformable claw 49. This retainer body 42 comprises an open end seat member 43, a lower joining member 44, a first engagement portion 45, second engagement portions 46, a guide portion 47 and stoppers 48. The open end seat member 43 is disposed at some axial distance from the tube engagement portion 41. The open end seat member 43 has a central hole 43a of a size to allow the annular projection 21 of the pipe body 2 to pass through.

Figure 3A:
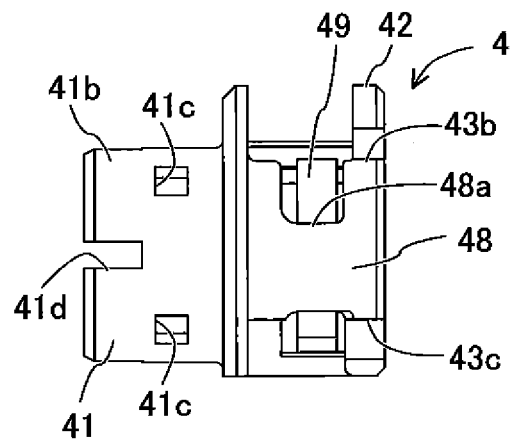
FIG. 3A is a front view of a retainer of FIG. 1A.
Figure 3B:
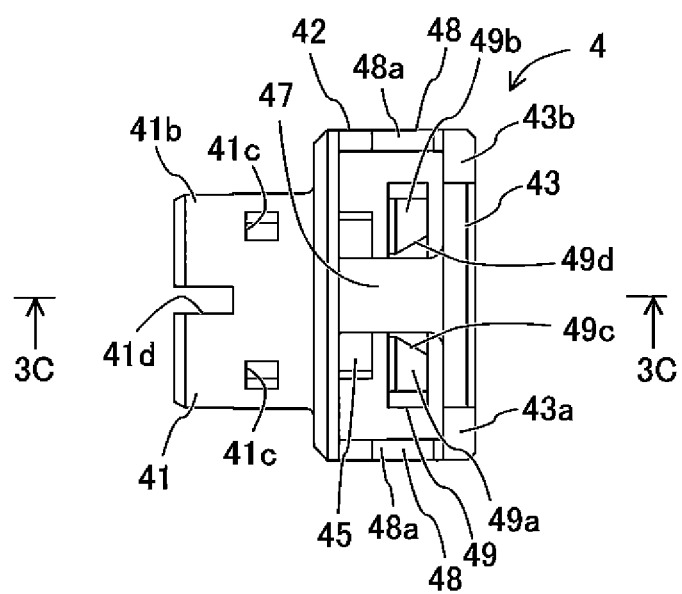
FIG. 3B is a plan view (a top view) of the retainer of FIG. 3A.
Figure 3C:
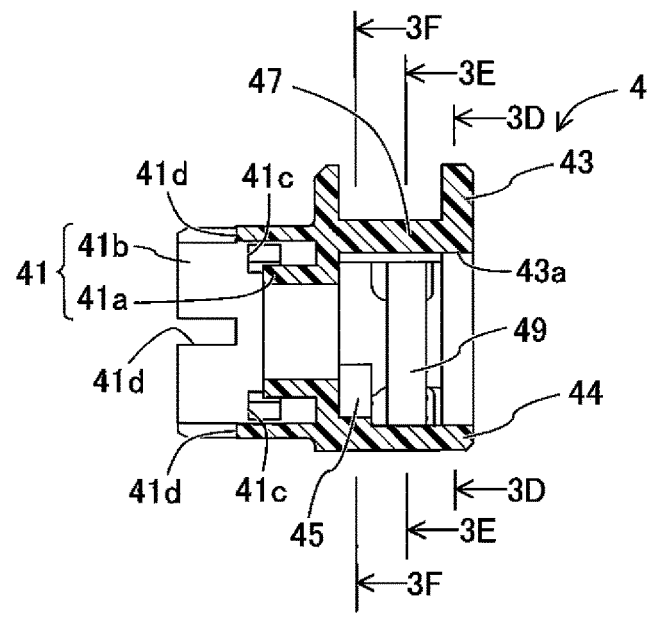
FIG. 3C is a cross-sectional view of the retainer, taken along line 3C-3C of FIG. 3B.
Figure 3D:
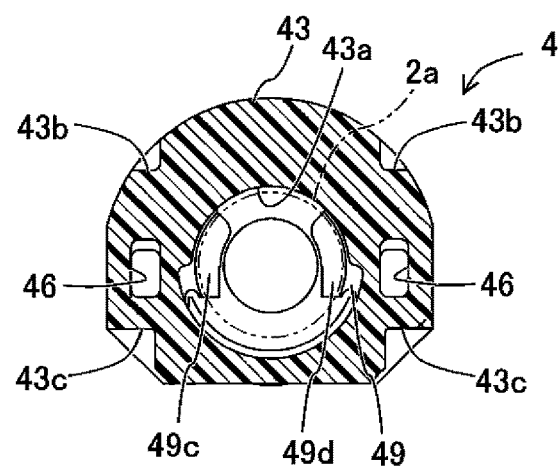
FIG. 3D is a cross-sectional view of the retainer, taken along line 3D-3D of FIG. 3C.

Furthermore, as shown in FIG. 3D, a pair of engagement holes serving as the second engagement portions 46 (hereinafter referred to as the "second engagement portions 46") are formed on both right and left sides of the central hole 43a in FIG. 3D when the open end seat member 43 is viewed from the axial direction. The pair of second engagement portions 46, 46 axially penetrate the retainer 4. In the initial state shown in FIG. 1A, distal-end projections 52a, 52b of axial elastically-deformable claws 52, 52 are respectively caught by the pair of second engagement portions 46, 46.

Moreover, as shown in FIG. 3D, a pair of upper cutouts 43b, 43b forming flat seats are respectively formed above the pair of second engagement portions 46, 46 on the outer circumferential surface of the open end seat member 43. The pair of upper cutouts 43b, 43b are used for initial positioning of the axial elastically-deformable claws 46, 46 of the checker 5 in order to form the initial state shown in FIG. 1A. That is to say, the pair of upper cutouts 43b, 43b are cutouts for easily assembling the checker 5 to the retainer body 42.

Figure 3E:
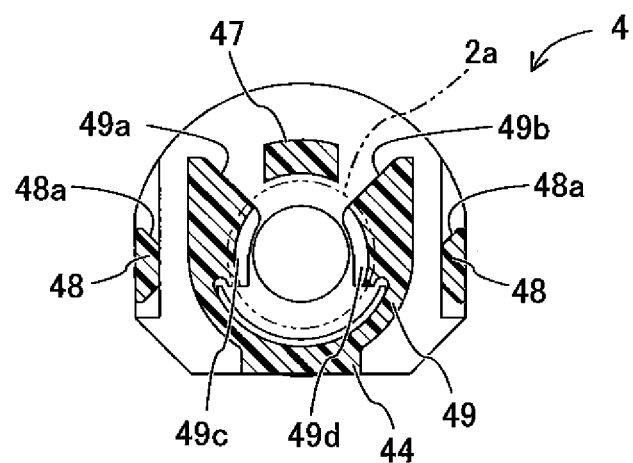
FIG. 3E is a cross-sectional view of the retainer, taken along line 3E-3E of FIG. 3C.
Figure 3F:
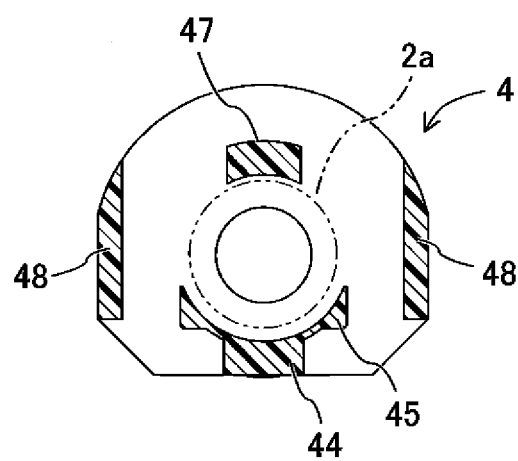
FIG. 3F is a cross-sectional view of the retainer, taken along line 3F-3F of FIG. 3C.

Additionally, as shown in FIG. 3D, a pair of lower cutouts 43c, 43c forming flat seats are respectively formed below the pair of second engagement portions 46, 46 on the outer circumferential surface of the open end seat member 43. The pair of lower cutouts 43c, 43c are used for positioning the axial elastically-deformable claws 52, 52 of the checker 5 in the engagement-confirmed state shown in FIG. 1C. As shown in FIGS. 3C, 3E and 3F, the lower joining member 44 is a portion for axially connecting a lower portion of the tube engagement portion 41 and a lower portion of the open end seat member 43.

As shown in FIG. 3F, the first engagement portion 45 is formed in a shape of a semi-circle which opens upward. As shown in FIG. 3C, the first engagement portion 45 is provided on an upper surface of the lower joining member 44 on a side of the tube engagement portion 41. The first engagement portion 45 is provided at a location which does not interfere with the annular projection 2a of the pipe body 2 indicated by the two-dot chain line in FIG. 3F. Both ends of the first engagement portion 45 are formed at an acute angle and right and left sides of the first engagement portion 45 in FIG. 3F are formed as vertical planes.

As shown in FIGS. 3B, 3C, 3E, and 3F, the guide portion 47 connects an upper side of the tube engagement portion 41 and an upper side of the open end seat member 43. This guide portion 47 is provided at a location which does not interfere with the annular projection 2a of the pipe body 2 indicated by the two-dot chain line in FIG. 3F.

As shown in FIGS. 3A, 3E, and 3F, a pair of stoppers 48, 48 respectively connect both lateral locations (right and left sides in FIGS. 3E and 3F) of a central hole of the tube engagement portion 41 and both lateral locations of the central hole 43a of the open end seat member 43. The pair of stoppers 48, 48 are provided at locations which do not interfere with the annular projection 2a of the pipe body 2 indicated by the two-dot chain line in FIG. 3F. Furthermore, as shown in FIG. 3A, a cutout 48a is formed on an upper side of an axially center portion of each of the pair of stoppers 48, 48. In the pipe body-inserted state shown in FIG. 1B, these cutouts 48a have a function to allow an increase in diameter of the retainer diameter-expanding elastically-deformable claw 49 of the retainer 4 and at the same time restrict an increase in diameter of the retainer diameter-expanding elastically-deformable claw 49 of the retainer 4 when the increase in diameter reaches a predetermined amount.

As shown in FIG. 3E, the retainer diameter-expanding elastically-deformable claw 49 of the retainer 4 is formed in a C shape which opens upward. The retainer diameter-expanding elastically-deformable claw 49 can increase in diameter by elastic deformation. As shown in FIG. 3C, this retainer diameter-expanding elastically-deformable claw 49 is provided on an approximately axially central portion of the upper surface of the lower joining member 44. That is to say, the retainer diameter-expanding elastically-deformable claw 49 is provided in an axial gap between the open end seat member 43 and the first engagement portion 45.

As shown in FIG. 3E, the retainer diameter-expanding elastically-deformable claw 49 in a diameter unexpanded state is provided at a location which interferes with the annular projection 2a of the pipe 2 indicated by the two-dot chain line in FIG. 3E. However, the retainer diameter-expanding elastically-deformable claw 49 allows the annular projection 2a of the pipe body 2a to pass through by increasing in diameter. That is to say, the retainer diameter-expanding elastically-deformable claw 49 exhibits a function to be axially engaged with and fixed to the annular projection 2a of the pipe body 2 by restoring its original shape after the annular projection 2a of the pipe body 2 passes through an axial location of the retainer diameter-expanding elastically-deformable claw 49.

Furthermore, as shown in FIG. 3E, distal-end surfaces 49a, 49b of the retainer diameter-expanding elastically-deformable claw 49 have inwardly-inclined plane shapes. This aims to increase the diameter of the retainer diameter-expanding elastically-deformable claw 49 when the distal-end surfaces 49a, 49b of the retainer diameter-expanding elastically-deformable claw 49 are pressed by release portions 55, 55 of the checker 5. Moreover, as shown in FIG. 3B, pipe-body-2-insertion side end surfaces 49c, 49d of a distal-end side of the retainer diameter-expanding elastically-deformable claw 49 are inclined so as to decrease in width in a direction from the pipe-body-2-insertion side (the right side in FIG. 3B) toward an opposite side to the pipe-body-2-insertion side (the left side in FIG. 3B). The inclination of the end surfaces 49c, 49d facilitates an increase in diameter when the annular projection 2a of the pipe body 2 passes through the retainer diameter-expanding elastically-deformable claw 49.

Detailed Configuration of Checker

Next, a detailed configuration of the checker 5 will be described with reference to FIGS. 4A to 4D. As described in the above "Piping Connection Structure Overview" section, the checker 5 is a member for confirming that the annular projection 2a of the pipe body 2 has been inserted in the normal position in the retainer 4. Examples of the material of the checker 5 include polyamide-based resin (aliphatic polyamides such as PA6, PA66, PA410, PA610, PA612, PA46, PA610, PA6/12, PA1012, PA1010, PA11 and PA12, and aromatic polyamides such as PA4T, PA6T, PA9T, PA10T, PA11T, PA12T, and MID nylon), polyester-based resin such as PBT, PET, and PBN, and polyolefin resin such as PE and PP.

The checker 5 comprises a checker diameter-expanding elastically-deformable claw 51, axial elastically-deformable claws 52, gap space occupying members 53, guide portions 54, and release portions 55.

Figure 4A:
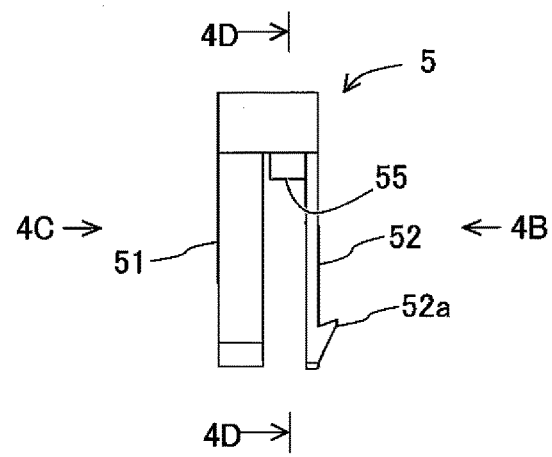
FIG. 4A is a front view of the checker of FIG. 1A.
Figure 4B:
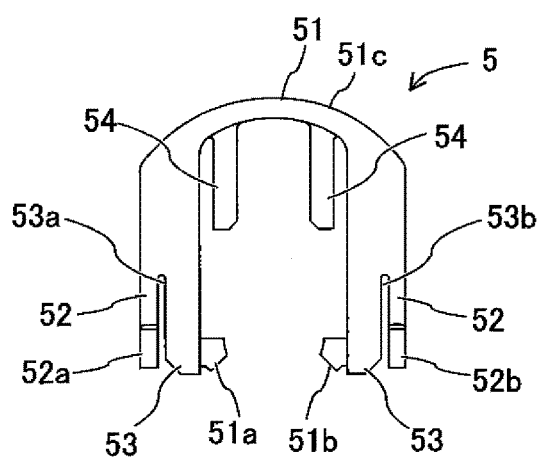
FIG. 4B is a right side view of the checker of FIG. 4A.
Figure 4C:
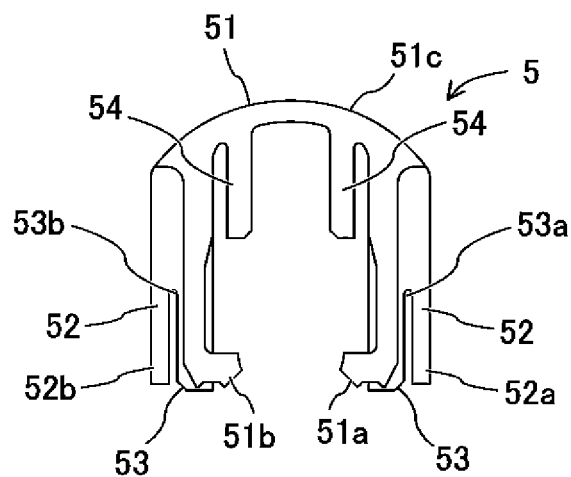
FIG. 4C is a left side view of the checker of FIG. 4A.

As shown in FIG. 4C, the checker diameter-expanding elastically-deformable claw 51 is formed in a C shape so as to be capable of increasing in diameter by elastic deformation. Projections 51a, 51b are formed on both distal ends of the checker diameter-expanding elastically-deformable claw 51 in a manner to project inward. Engagement of the checker diameter-expanding elastically-deformable claw 51 in a diameter unexpanded state with the first engagement portion 45 of the retainer 4 restricts the checker 5 from sliding against the retainer body 42. Moreover, the checker diameter-expanding elastically-deformable claw 51 is increased in diameter by the annular projection 2a of the pipe body 2 after having passed through the retainer diameter-expanding elastically-deformable claw 49. Then the checker diameter-expanding elastically-deformable claw 49 in the diameter expanded state is disengaged from the first engagement portion 45, thereby allowing the checker 5 to slide against the retainer body 42.

The pair of axial elastically-deformable claws 52, 52 are provided on a base portion 51c of the checker diameter-expanding elastically-deformable claw 51. The pair of axial elastically-deformable claws 52, 52 are provided at some distance in the horizontal direction in FIG. 4A (corresponding to the axial direction in FIG. 1A) from the checker diameter-expanding elastically-deformable claw 51. Distal-end sides of the axial elastically-deformable claws 52, 52 are formed in a manner to be capable of flexural deformation in the horizontal direction in FIG. 4A. Projections 52a, 52b are formed at the distal ends of the axial elastically-deformable projections 52, 52 so as to project in the right direction in FIG. 4A.

Moreover, the axial elastically-deformable claws 52, 52 are restricted from undergoing flexural deformation by the retainer diameter-expanding elastically-deformable claw 49 in a diameter expanded state, and thereby keep engaged with the second engagement portions 46 of the retainer body 42. Furthermore, the engagement of the axial elastically-deformable claws 52, 52 with the second engagement portions 46 of the retainer body 42 restricts the checker 5 from sliding against the retainer body 42. On the other hand, when the retainer diameter-expanding elastically-deformable claw 49 restores its original shape, the axial elastically-deformable claws 52, 52 get disengageable from the second engagement portions 46 of the retainer body 42, thereby allowing the checker 5 to slide against the retainer body 42.

As shown in FIG. 4B, the pair of gap space occupying members 53, 53 are respectively formed on radially inner sides of the axial elastically-deformable claws 52, 52 with slits 53a, 53b therebetween. The pair of gap space occupying members 53, 53 are members to be disposed in an axial gap between the open end seat member 43 of the retainer body 42 and the retainer diameter-expanding elastically-deformable claw 49 in a period from the initial state shown in FIG. 1A to the confirmed state shown in FIG. 1C.

As shown in FIG. 4C, the guide portions 54, 54 are provided on the base portion 51c of the checker diameter-expanding elastically-deformable claw 51 and formed on an inner side of the C shape of the checker diameter-expanding elastically-deformable claw 51. These guide portions 54, 54 are separated from each other by a distance corresponding to width of the guide portion 47 of the retainer 4. These guide portions 54, 54 of the checker 5 have a function to restrict relative rotation and guide relative slide in the vertical direction in FIG. 4C of the retainer 4 and the checker 5 by being engaged with the guide portion 47 of the retainer 4.

Figure 4D:
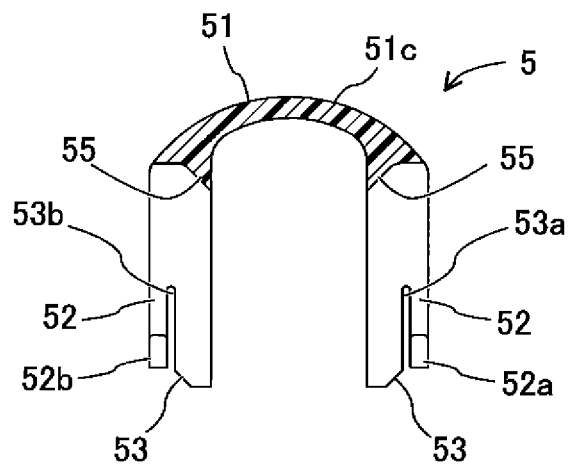
FIG. 4D is a cross-sectional view of the checker, taken along line 4D-4D of FIG. 4C.

As shown in FIGS. 4A and 4D, the release portions 55, 55 are provided at the base portion 51c of the checker diameter-expanding elastically-deformable claw 51 and formed in respective axial gaps between the axial elastically-deformable claws 52, 52 and the guide portions 54, 54. As shown in FIG. 4D, these release portions 55, 55 are inclined from an inner side toward an outer side. These release portions 55, 55 are formed in shapes corresponding to inclined shapes of the distal-end surfaces 49a, 49b of the retainer diameter-expanding elastically-deformable claws 49. The release portions 55, 55 increase the diameter of the retainer diameter-expanding elastically-deformable claw 49 by sliding the checker 5 against the retainer 4.

It should be noted that since operations of the retainer 4 and the checker 5 are similar to those of the second housing (30) and the checker (50) described in Japanese Patent No. 4,937,426, their detailed description is omitted.

Advantageous Effects

As having discussed heretofore, in the resin tube 3, the tapered diameter-expanding portion 32a and the cylindrical portion 32b of the first diameter-expanding portion 32 have the same or greater thickness than the tube body portion 31. Even if external force is applied and thereby the first diameter-expanding portion 32 of the resin tube 3 receives axial force from the seal members 71, 72, this enables to suppress deformation of the first diameter-expanding portion 32. As a result, a decrease in sealing performance can be suppressed.

Particularly the tapered diameter-expanding portion 32a of the first diameter-expanding portion 32 is designed to increase in thickness in a radially outward direction. Since this allows a continuous increase in elastic modulus of the first diameter-expanding portion 32, deformation of the first diameter-expanding portion 32 can be further suppressed. Hence, sealing performance can be further improved.

Moreover, the inner side of the first diameter-expanding portion 32 of the resin tube 3 is a portion through which fuel flows. A portion of the first diameter-expanding portion 32 to be connected to the tube body portion 31 is constituted by the tapered diameter-expanding portion 32a. That is to say, the inner circumferential surface of the first diameter-expanding portion 32 is not a stepped passage, which causes sharp changes, but an inclined and continuous passage. Accordingly, this allows smooth fuel flow.

Furthermore, the amount of fuel permeation comes into question in a portion of the resin tube 3 through which fuel flows. Then, as mentioned before, the first diameter-expanding portion 32 constitutes a portion through which fuel flows. Here, the tapered diameter-expanding portion 32a and the cylindrical portion 32b of the first diameter-expanding portion 32 have the same or greater thickness than the tube body portion 31. Accordingly, the amount of fuel permeation at the tapered diameter-expanding portion 32a and the cylindrical portion 32b can be equal to or smaller than the amount of fuel permeation at the tube body portion 31. Accordingly, the amount of fuel permeation in the first diameter-expanding portion 32 does not cause a problem.

Furthermore, in the above piping 1, the retainer 4 in the form of a separate body from the resin tube 3 is used as a member for restricting the pipe body 2 from coming off. Accordingly, the retainer 4 restricts the pipe body 2 from coming off. That is to say, the resin tube 3 is not to be caught by the annular projection 2a of the pipe body 2 and even if the pipe body 2 is removed from or inserted into the resin tube 3, it gives no effect on the resin tube 3. Hence, the above piping 1 can improve the resin tube 3 in durability.

Moreover, in the present example, a method of connecting the resin tube 3 and the retainer 4 employs the engagement pairs of the engagement projections 33a and the engagement recesses 41c. These physical catches of projections and recesses achieve reliable connection of these two members. Here, the second diameter-expanding portion 33 has the same or greater thickness than the tube body portion 31. When the resin tube 3 is formed by extrusion molding and projections or recesses such as the engagement projections 33a are formed on the resin tube 3 discontinuously in a circumferential direction, height of the projections or recesses needs to be equal to or smaller than the thickness. Therefore, the engagement projections 33a can secure a sufficiently high height by sufficiently increasing the thickness of the second diameter-expanding portion 33. Accordingly, the engagement projections 33a can exhibit sufficient engaging force.

Furthermore, the tube engagement portion 41 of the retainer 4 has the inner cylindrical portion 41a and the outer cylindrical portion 41b, and the second diameter-expanding portion 33 of the resin tube 3 is disposed in the radial gap between the inner cylindrical portion 41a and the outer cylindrical portion 41b. Therefore, when the engagement projections 33a are caught in the engagement recesses 41c, the second diameter-expanding portion 33 cannot deform either in the radially inward direction or in the radially outward direction. If the second diameter-expanding portion 33 should deform in a radial direction, there will arise a risk of decreasing engaging force of the engagement projections 33a and the engagement recesses 41c. However, since the second diameter-expanding portion 33 does not deform in a radial direction as mentioned above, engaging force of the engagement projections 33a and the engagement recesses 41c is very strong.

In particular, the plurality of engagement projections 33a and the plurality of engagement recesses 41c are distributed uniformly in a circumferential direction. Accordingly, a variation in engaging force caused by rotational phases is small and the engaging force is stable. As a result, connecting force of the resin tube 3 and the retainer 4 can be reliably exhibited in a well-balanced manner.

Furthermore, if the engagement projections 33a should be hided inside the outer cylindrical portion 41b of the tube engagement portion 41 of the retainer 4 in fitting the engagement projections 33a into the engagement recesses 41c, it will be impossible to optically check whether rotational phases of the engagement projections 33a are in agreement with those of the engagement recesses 41c. However, since the guide projections 33b and the guide recesses 41d can always be seen from the outside in the abovementioned piping 1, if the rotational phases of the guide projections 33b are brought in agreement with those of the engagement recesses 41c, then rotational phases of the engagement projections 33b come in agreement with those of the engagement recesses 41d. Accordingly, fitting the retainer 4 to the resin tube 4 can be easily and reliably achieved by the guide projections 33b and the guide recesses 41d.

Example 2

Figure 5:
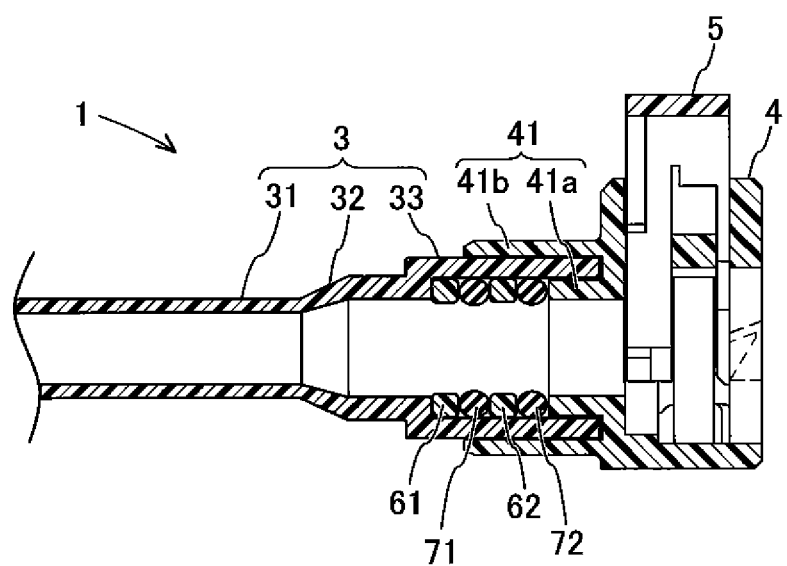
FIG. 5 is an axial cross-sectional view of a resin tube of Example 2.

A piping connection structure of Example 2 will be described with reference to FIG. 5. As shown in FIG. 5, a second diameter-expanding portion 33 of a resin tube 3 of this example does not have either the engagement portions 33a or the guide projections 33b of the above example. Moreover, a tube engagement portion 41 of a retainer 4 of this example does not have either the engagement recesses 41c or the guide recesses 41d of the above example. Since constitutional features other than the above are the same as those of Example 1, these are assigned with the same reference signs and their description is omitted.

In this example, the second diameter-expanding portion 33 and the tube engagement portion 41 are connected together not by physically catching each other but welding. Therefore, these two members do not have any projections or recesses but are connected together. Connecting these two members by welding in this way allows shape simplification of the second diameter-expanding portion 33 and the tube engagement portions 41 of the retainer 4.

In this case, too, the tube engagement portion 41 has an inner cylindrical portion 41a and an outer cylindrical portion 41b, and the second diameter-expanding portion 33 is inserted in a radial gap between these portions. Accordingly, since a weld area of the second diameter-expanding portion 33 and the tube engagement portion 41 can be secured sufficiently large, a great connecting force can be exhibited. Furthermore, since the second diameter-expanding portion 33 is radially held between these two portions, the second diameter-expanding portion 33 is suppressed from being deformed to fall down in a radial direction thereof. This also ensures exhibition of the great connecting force.

Others

In Example 1, the engagement projections 33a and the guide projections 33b are formed on the second diameter-expanding portion 33 of the resin tube 3, while the engagement recesses 41c and the guide recesses 41d are formed on the tube engagement portion 41 of the retainer 4. The projections and the recesses can be formed on opposite component members to the above.

Moreover, in Examples 1 and 2, the second diameter-expanding portion 33 of the resin tube 3 is inserted between the inner cylindrical portion 41a and the outer cylindrical portion 41b of the tube engagement portion 41 of the retainer 4. In addition to this configuration, the following configuration can be employed. The tube engagement portion 41 can have only the inner cylindrical portion 41a, and the second diameter-expanding portion 33 can be engaged with or welded to the inner cylindrical portion 41a.

When the second diameter-expanding portion 33 is engaged with the inner cylindrical portion 41a, it can be achieved, for example, by forming one or more projections on an outer circumferential side of the inner cylindrical portion 41a and one or more recesses on an inner circumferential side of the second diameter-expanding portion 33, or by forming one or more projections on an inner circumferential side of the second diameter-expanding portion 33 and one or more recesses on an outer circumferential side of the inner cylindrical portion 41a.

REFERENCE SIGNS LIST

1: piping, 2: pipe body, 2a: annular projection, 3: resin tube, 4: retainer, 5: checker, 31: tube body portion, 32: first diameter-expanding portion, 32a: tapered diameter-expanding portion, 32b: cylindrical portion, 33: second diameter-expanding portion, 33a: engagement projection (one-side element of engagement pair), 33b: guide projection (one-side element of guide pair), 41: tube engagement portion, 41a: inner cylindrical portion, 41b: outer cylindrical portion, 41c: engagement recess (the-other-side element of engagement pair), 41d: guide recess (the-other-side element of guide pair), 71, 72: seal member

What is claimed is:

1. A piping connection structure comprising:
a pipe body having an annular projection projecting radially outward at some distance from a fore end thereof;
a resin tube into which a fore end side of the pipe body is to be inserted;
a retainer formed in a hollow cylindrical shape, connected to an axial end of the resin tube, and restricting the pipe body from coming off by being engaged with the annular projection of the pipe body when the pipe body is inserted therein; and
a seal member to be disposed in a radial gap between an inner circumferential surface of the resin tube and an outer circumferential surface of the pipe body;
the resin tube comprising:
a tube body portion;
a first diameter-expanding portion formed to increase in diameter from an axial end of the tube body portion toward an open end of the resin tube; and
a second diameter-expanding portion formed to further increase in diameter from the first diameter-expanding portion, and to contact an outer circumferential side of the seal member and be connected to the retainer while in contact with the retainer, wherein the first diameter-expanding portion has the same or greater thickness than the tube body portion, the first diameter-expanding portion comprises a tapered diameter-expanding portion, the tapered diameter-expanding portion gradually increases in thickness toward the open end side of the resin tube, and the seal member is axially positioned between the first diameter-expanding portion and the retainer.

2. The piping connection structure according to claim 1, wherein the second diameter-expanding portion is connected to the retainer by welding.

3. The piping connection structure according to claim 2, wherein the retainer has an inner cylindrical portion and an outer cylindrical portion having a radial gap therebetween; and the second diameter-expanding portion is inserted in the radial gap between the inner cylindrical portion and the outer cylindrical portion of the retainer.

4. The piping connection structure according to claim 1, wherein the retainer and the second diameter-expanding portion have an engagement pair whose elements axially catch each other; and the retainer and the second diameter-expanding portion are connected together by the engagement pair.

5. The piping connection structure according to claim 4, wherein the second diameter-expanding portion has the same or greater thickness than the tube body portion.

6. The piping connection structure according to claim 4, wherein the retainer has an inner cylindrical portion and an outer cylindrical portion having a radial gap therebetween; the second diameter-expanding portion is inserted in the radial gap between the inner cylindrical portion and the outer cylindrical portion; and at least one of the inner cylindrical portion and the outer cylindrical portion, and the second diameter-expanding portion have the engagement pair.

7. The piping connection structure according to claim 4, wherein the engagement pair is provided discontinuously in a circumferential direction; the retainer and the second diameter-expanding portion have at least one guide pair for guiding relative rotational phases in fitting each other.

8. The piping connection structure according to claim 7, wherein the at least one guide pair comprises a plurality of guide pairs distributed uniformly in a circumferential direction.

9. The piping connection structure according to claim 1, wherein the first diameter-expanding portion comprises the tapered diameter-expanding portion on a side of the tube body portion and a cylindrical portion on the open end side of the resin tube, which is an opposite side to the tube body portion.

10. The piping connection structure according to claim 1, wherein the resin tube is formed by extrusion molding.

11. The piping connection structure according to claim 1, wherein the tube body portion constitutes a main part of a fuel conveyor portion of the resin tube and is a longest portion in the resin tube.

12. The piping connection structure according to claim 1, wherein a radial thickness of the tube body portion is determined in consideration of an amount of fuel permeation.

* * * * *